United States Patent [19]

Bogdany

[11] Patent Number: 4,634,730
[45] Date of Patent: Jan. 6, 1987

[54] CARPET TILES

[75] Inventor: John Bogdany, Fort Oglethorpe, Ga.

[73] Assignee: GenCorp Inc., Akron, Ohio

[21] Appl. No.: 803,185

[22] Filed: Dec. 2, 1985

Related U.S. Application Data

[62] Division of Ser. No. 615,860, May 31, 1984, Pat. No. 4,595,617.

[51] Int. Cl.$^4$ .............................................. C08K 3/26
[52] U.S. Cl. ................................. 524/425; 524/522; 524/523; 524/527
[58] Field of Search ................. 524/425, 522, 523, 527

[56] References Cited

U.S. PATENT DOCUMENTS

| | | | |
|---|---|---|---|
| 2,403,215 | 7/1946 | Foster | 524/425 |
| 2,713,563 | 7/1955 | Kuhn | 524/425 |
| 3,281,258 | 10/1966 | Callahan | 428/289 |
| 3,356,625 | 12/1967 | Giessler | 524/425 |
| 3,502,611 | 3/1970 | Palmer et al. | 524/425 |
| 4,172,067 | 10/1979 | Benton et al. | 521/65 |
| 4,276,339 | 6/1981 | Stoveken | 428/154 |

FOREIGN PATENT DOCUMENTS

| | | | |
|---|---|---|---|
| 52-25195 | 2/1977 | Japan | 524/425 |
| 59-120645 | 7/1984 | Japan | 524/425 |
| 1518324 | 7/1978 | United Kingdom | 524/425 |
| 2085899 | 5/1982 | United Kingdom | 524/425 |

Primary Examiner—Joseph L. Schofer
Assistant Examiner—N. Sarofim

[57] ABSTRACT

An aqueous frothed and filled vinyl chloride and/or vinylidene chloride polymer latex containing an emulsified plasticizer is used to coat and impregnate the back of a carpet. The carpet containing the froth is heated to drive off or evaporate the water and gel the vinyl polymer. While still hot or soft, the froth on the carpet is densified to obtain uniform dimensions or thickness. The resulting laminate is then cooled and cut to the required shape and size for carpet tiles.

6 Claims, 2 Drawing Figures

CARPET TILES

This is a divisional application of application Ser. No. 06/615,860 filed May 31, 1984 now U.S. Pat. No. 4,595,617.

This invention relates to a method or process for making carpet or floor tiles.

An object of this invention is to provide a method or process for making carpet tiles and to the product of said method.

Figure 1:
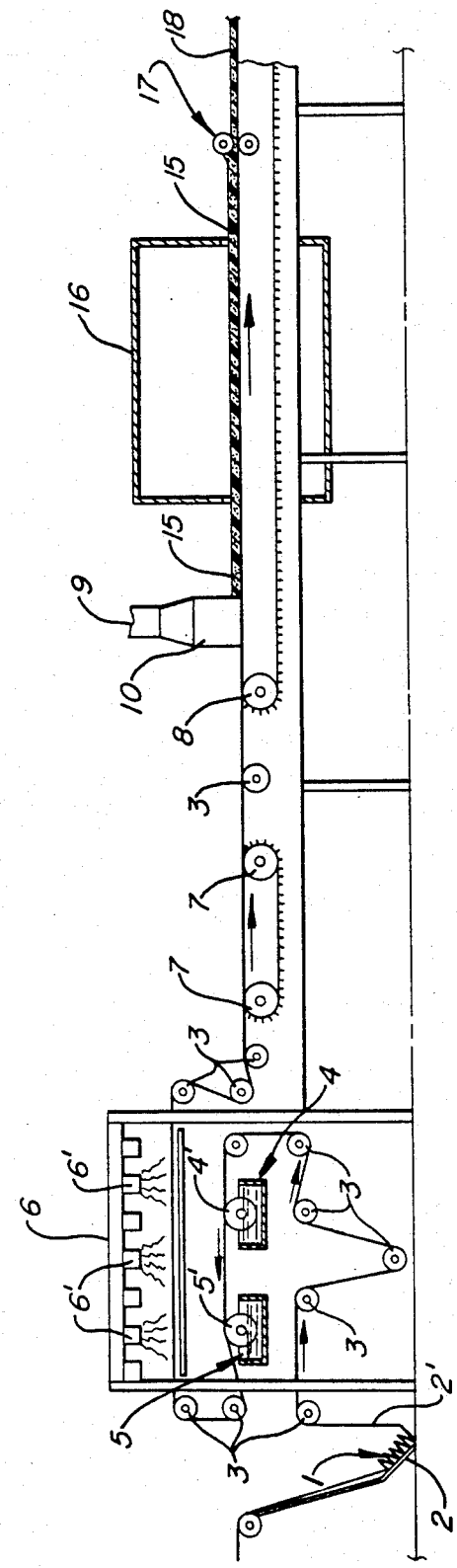
Figure 2:
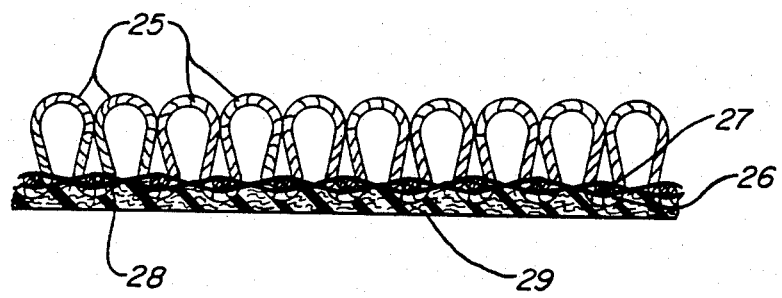

These and other objects and advantages of the present invention will become more apparent to those skilled in the art from the following detailed description, examples and accompanying drawings in which:

FIG. 1 is a vertical schematic view of an arrangement of apparatus which may be used in the practice of the process of the present invention and FIG. 2 is a vertical cross-sectional view of a carpet or floor tile produced by the process of the present invention.

SUMMARY OF THE INVENTION

According to the present invention, it has been found that a composition of a latex or emulsion of a vinyl chloride and/or vinylidene chloride polymer or copolymer, filler and emulsified plasticizer can be frothed and used to coat and impregnate the back of a carpet. After heating to drive off the water and gel or fuse the polymer to plasticize the same, the carpet containing the froth is passed under squeeze or embossing rolls to obtain uniform thickness. After cooling to about room temperature, the carpet is cut into suitable shapes useful as carpet tiles. An advantage of the present invention is that use can be made of conventional carpet finishing equipment. Also, the present process is more economical in that up to 300, or to 500, parts by weight of filler per 100 parts by weight of vinyl polymer can be used. On the other hand, polyvinyl chloride plastisols can accept only up to about 150 parts by weight of filler per 100 parts by weight of the polyvinyl chloride resin in the plastisol. Also, polyvinyl chloride plastisol compositions require special coating and heating equipment which is eliminated in the practice of the present invention, and such polyvinyl chloride plastisol compositions cannot be run on regular carpet equipment.

In FIG. 1 the arrows indicate the direction of movement of the carpet. As shown in FIG. 1, a supply of jute or polypropylene backed tufted carpet 1 from carpet supply "J Box" 2 is carried by conveyor 2' over rollers 3, 3 (same number for all of the conveyor rollers) to dip pan 4 containing an aqueous precoating or preimpregnating composition which is applied to the back of the carpet by means of roller coater 4' dipping in the composition. The carpet then is precoated a second time using a precoating composition in dip pan 5 which is applied by roller coater 5'. The precoating compositions can comprise a carboxylated butadiene-styrene copolymer latex composition or even a plasticized vinyl chloride copolymer latex composition used as adhesives to help secure the bottom of the carpet tufts to the square woven fabric backing. The precoated carpet is then passed through preheater 6 containing heating elements 6', 6' to dry the carpet. After drying, the carpet is passed over pretenter 7, 7 and under the froth or foam applicator and on oven tenter 8 where the frothed filled plasticizer containing thermoplastic vinyl polymer latex composition is applied to the back of the carpet by means of supply hose 9 and applicator 10. The frothed latex layer 15 on the back of the carpet then passes through oven 16 where it is dried to remove the water and to fuse or gel the vinyl polymer to make a flexible frothed vinyl polymer. Next, the dry frothed vinyl polymer composition on the back of the carpet is passed between crushing or embossing rollers 17 to emboss or size the froth while still soft or warm to get the desired thickness, dimension or finish for the vinyl polymer composition backed carpet 18. After cooling to room temperature (about 25° C.), the carpet is cut into squares or other shapes to form carpet tiles.

In FIG. 2 there is shown a floor tile of the present invention comprising a tufted carpet containing a crushed or embossed filled vinyl polymer composition backing. Exterior tufts or piles 25 are woven at their bases 26 with square woven jute or polypropylene backing 27 and secured by adhesive layer 28. The crushed or embossed filled vinyl polymer layer 29 has impregnated and coated the back of the carpet to form the carpet tile.

DISCUSSION OF DETAILS AND PREFERRED EMBODIMENTS

The polymer of the latex comprises a vinyl chloride homopolymer, vinylidene chloride homopolymer, vinyl chloride-vinylidene chloride copolymers or mixtures thereof. Also, there can be used copolymers of at least 50% by weight of at least one monomer selected from the group consisting of vinyl chloride and vinylidene chloride and the balance essentially at least one other copolymerizable or copolymerized monoethylenically unsaturated monomer, other than said vinyl chloride and said vinylidene chloride monomers, having from 2 to 14 carbon atoms and mixtures of such copolymers. Such other copolymerizable monomers are the nitriles like acrylonitrile and methacrylonitrile; the acids like acrylic, methacrylic, itaconic, maleic and fumaric acids and their esters like methyl acrylate, ethyl acrylate, butyl acrylate, octyl acrylate, methyl methacrylate, n-butyl methacrylate, n-octyl methacrylate, diethyl maleate and diethylfumarate; olefins like ethylene, propylene and isobutylene; maleic anhydride; vinyl acetate; vinyl benzoate and butyl vinyl ether and the like and mixture of the same. These copolymers, also, may be made by graft or overpolymerization. Mixtures of homo and copolymer latices can be used. Some examples of the vinyl chloride and/or vinylidene chloride containing copolymers are vinyl chloride-acrylonitrile copolymer, vinyl chloride-diethylmaleate copolymer, vinyl chloride-diethyl fumarate copolymer, vinyl chloride-maleic anhydride copolymer, vinyl chloride-vinyl acetate copolymer, vinyl chloride-ethylene copolymer, vinyl chloride-vinyl acetate-maleic anhydride copolymer, vinyl chloride-isobutylene copolymer, vinyl chloride-vinyl isobutyl ether copolymer, vinyl chloride-acrylic acid copolymer, vinyl chloride-methacrylic acid copolymer, vinyl chloride-itaconic acid copolymer, vinyl chloride-methyl acrylate copolymer, vinyl chloride-ethyl acrylate copolymer, vinyl chloride-butyl acrylate copolymer, vinyl chloride-octyl acrylate copolymer, vinyl chloride-methyl methacrylate copolymer, vinyl chloride-vinyl benzoate copolymer, vinyl chloride-butyl acrylate-acrylic acid copolymer, vinylidene chloride-acrylonitrile copolymer, vinylidene chloride-methacrylonitrile copolymer, vinylidene chloride-methyl acrylate copolymer, vinylidene chloride-butyl acrylate copolymer, vinylidene chloride-diethyl fumarate copolymer, vinylidene chloride-butyl vinyl ether copolymer, vinylidene chloride-fumaric acid copolymer, vinylidene chloride-maleic acid copolymer, vinyl chloride-vinylidene chloride-2-ethyl hexyl acrylate copolymer, vinylidene chloride-vinyl chloride-acrylonitrile copolymer and the like and mixtures thereof. Vinyl chloride copolymers containing —COOH moities from acrylic acid and the like are preferred.

One or more surfactants are used during emulsion polymerization to form the latices. Mixtures of surfactants can be used. Surfactants include conventional surfactants, emulsifiers, soaps, micelle formers, stabilizers and so forth which are compatible with the monomers and catalysts used during the aqueous free radical emulsion polymerization. Examples of some surfactants which may be used are sodium dodecyl diphenyl oxide disulfonate, sodium lauryl sulfate, sodium dodecyl sulfate, sodium decyl diphenyl oxide disulfonate, sodium dodecyl sulfonate, sodium dodecyl benzene sulfonate, bis(1-methylamyl) sodium sulfosuccinate, diamyl sodium sulfosuccinate, diisobutyl sodium sulfosuccinate, dihexyl sodium sulfosuccinate, di-tridecyl sodium sulfosuccinate, sodium rosinate, dioctyl sodium sulfosuccinate, potassium stearate, potassium soap of disproportionated wood rosin, potassium laurate, potassium soap of disproportionated tall oil rosin, sodium soap of stabilized resin, N-octadecyl sulfosuccinamate, ammonium stearate and the like.

Polymerization of the monomers is effected by free-radical catalysts (free-radical formers or free-radical forming systems) or initiators such as ammonium, potassium and/or sodium persulfate, $H_2O_2$ and the like in an amount sufficient for polymerization of the monomers and to obtain the desired molecular weight. Other free-radical catalysts can be used which decompose or become active at the temperature used during polymerization. Examples of other free-radical catalysts are cumene hydroperoxide, dibenzoyl peroxide, diacetyl peroxide, didecanoyl peroxide, di-t-butyl peroxide, dilauroyl peroxide, bis(p-methoxy benzoyl) peroxide, t-butyl peroxy pivalate, dicumyl peroxide, isopropyl percarbonate, di-sec-butyl peroxydicarbonate, azobisdimethylvaleronitrile, 2,2'-azobisisobutyronitrile, 2,2'-azobis-2-methylbutyronitrile and 2,2'-azobis (methylisobutyrate) and the like and mixtures of the same. Redox systems, also, can be used. Only minor amounts of catalyst are necessary to effect polymerization.

Temperatures used during emulsion polymerization should be sufficient to effect polymerization by activation of the catalyst and double bonds of the monomer(s). They should not be too high to cause a runaway reaction and not too low to retard polymerization. In general, the temperature may be from about 50° to 80° C. Times for polymerization may vary from about 5 to 14 hours depending on the degree of polymerization desired. Generally, it is desired to carry polymerization to 100% conversion.

The water used during emulsion polymerization should be free of deleterious materials and preferably should be distilled or ion exchanged. Sufficient water is used to enable formation of the emulsion and to enable proper mixing or stirring of the ingredients during polymerization to obtain the desired rate and degree of polymerization, heat transfer and so forth. The solids content (after removal of water), thus, may vary from about 10 to 60% by weight, preferably from about 30 to 55% by weight.

Polymerization preferably should be conducted in a closed reactor, such as a pressure reactor, fitted with a stirrer or other agitating means, heating and cooling means, with means to flush with or pump in an inert gas such as nitrogen, helium, argon, neon and the like in order to polymerize preferably under inert or non-reactive conditions, with means to charge monomer, water, catalysts and so forth, venting means, and with means to recover the polymer and so forth. The reactor should be cleaned or flushed out between polymerization runs to remove traces of shortstops, catalysts, modifier, residues and so forth which might interfere with subsequent polymerizations. There should be sufficient agitation or stirring of the polymerization media to ensure thorough mixing, diffusion, contact and so forth.

Modifiers, chelating agents, reducing agents, buffers and the like may be used during polymerization. Also, short stops may be added to stop the polymerization. After polymerization there may be added to the latex stabilizers, antioxidants, biocides, antidegradants, preservatives and the like.

Free radical aqueous emulsion polymerization and copolymerization, including graft or overpolymerization, to form latices of ethylenically unsaturated monomers is well known to those skilled in the art. Since some monomers may polymerize faster than others, some blocks may form in the copolymers. Blocks may be reduced or eliminated by proportioning or other means as disclosed in the prior art. In this connection please see Bovey et al, "Emulsion Polymerization," High Polymers, Vol. IX, Interscience Publishers, Inc., 1955; Schildknecht, "Vinyl and Related Polymers," John Wiley & Sons, Inc., New York, 1952; "Encyclopedia of Polymer Science and Technology," Vol. 5 (1966), Vol. 8 (1968), Vol. 10 (1969) and Vol. 14 (1971), Interscience Publishers, a division of John Wiley & Sons, Inc., New York; Ham, "Copolymerization," High Polymers, Vol. XVIII, Interscience Publishers a division of John Wiley & Sons, New York, 1964; Burlant and Hoffman, "Block and Graft Polymers," Reinhold Publishing Corporation, New York, 1960; Ceresa, "Block and Graft Copolymers," Butterworth & Co. (Publishers) Ltd., London, 1962; Ceresa, "Block and Graft Copolymerization," Vol. 1 (1973) and Vol. 2 (1976), John Wiley & Sons, Ltd., New York; Battaerd and Tregear, "Graft Copolymers," Polymer Reviews, Vol. 16, Interscience Publishers, a division of John Wiley & Sons, New York, 1967 and "Modern Plastics Encyclopedia," Vol. 57, No. 1OA, 1980–81, October 1980, McGraw-Hill, Inc., New York. The graft copolymer may contain all graft copolymer but also may be a mixture of homopolymers, copolymers as well as the graft itself, depending on the rate of polymerization of the monomers under the polymerization conditions and so forth.

To make the carpet backing composition the vinyl polymer latices are mixed with one or more emulsified compatible plasticizers, fillers and a frothing agent.

Examples of suitable or compatible plasticizers for the above thermoplastic vinyl polymers are the adipates like dibutyl adipate, di-(2-ethyl hexyl) adipate, dicapryl adipate, polyester adipates and so forth; the azealates like di-(2-ethyl hexyl) azealate, dibutoxyethyl azealate and so forth; the benzoates like diethylene glycol dibenzoate, dipropylene glycol dibenzoate; the epoxy derivatives like epoxidized soy bean oil; the glutarates like diisodecyl glutarate, polyester glutarates and so forth; the chlorinated paraffins; the phosphates like tri-(2-ethyl hexyl) phosphate, tri cresyl phosphate and so forth; the phthalates like dibutyl phthalate, diisononyl phthalate, dioctyl phthalate (preferred), di-(2-ethyl hexyl) phthalate, diisodecyl phthalate, didecyl phthalate and so forth; polymeric polyesters; the sebacates like dibutyl sebacate, dioctyl sebacate and so forth and the like and mixtures thereof. The plasticizers are mixed in a suitable mixing machine with water and a surfactant similar to that used during polymerization to emulsify the plasticizer. The water is used in an amount sufficient to provide a solids content of the plasticizer of from about 60 to 80% by weight. In general, the plasticizer (dry) is used in an amount required to get the desired flexibility, lowered Tg or softness on gelling or fusing of the vinyl polymer. Preferably, the plasticizer is used on a dry weight basis in an amount of from about 15 to 75, more preferably from about 40 to 60, parts by weight per 100 parts by weight total (dry) of the vinyl polymer(s). Some commercially available vinyl chloride type latices are already preplasticized, but it may be desirable or necessary to add more emulsified plasticizer.

Inorganic fillers are added to the latex in an amount of from about 100 to 500, preferably from about 200 to 400, parts by weight per 100 parts by weight (dry) of the vinyl polymers. Examples of useful fillers are calcium carbonate (preferred), barytes, aluminum trihydrate, clay and the like and mixtures thereof. The fillers should be finely divided.

A frothing agent is used in a minor amount by weight (dry) sufficient to froth the vinyl polymer composition. Preferably, it is used in an amount of from about 2 to 7 phr (dry basis) to form a froth or foam of the latex, emulsified plasticizer and filler. Frothing agents to form foams are well known. A suitable frothing agent comprises urea, the sodium salt of condensed naphthalene sulfonic acid, mixed $C_8$-$C_{18}$ fatty alcohols, ammonium or sodium lauryl sulfate and water. See U.S. Pat. No. 4,172,067. The frothing or whipping of the latex mixture or composition can be conducted in an Oakes, Firestone or other type foamer using air or an inert gas like nitrogen to the desired froth density. Mixtures of frothing agents can be used.

When frothed, these backing compositions can give compound frothed density ranges of from about 500 to 1500 grams per quart using the Oakes, Firestone or other type carpet industry foamer after adjustment of the foamer.

In some instances it is not necessary to pass air or inert gas through the Oakes or other foamer to mix with the backing composition to froth the composition. Rather, reliance can be had on the air or gas already absorbed by the ingredients of the backing composition on their production, exposure to the atmosphere, handling, mixing together and so forth to obtain the desired froth density.

Other compounding ingredients may be added to the vinyl polymer latex composition or compound such as thickeners, pigment colors, additional surfactants, defoamers for use during blending and so forth.

The compounded aqueous frothed vinyl polymer coating composition can be applied to the back of the carpet by air knife coating, blade coating, brush-finish coating, cast coating, flow-on coating, knife coating, machine coating, polished drum coating, print on coating, roll coating, spray coating, wire wound rod coating or other methods known to the art for coating the backing of a carpet. The frothed vinyl composition is applied to the back of the carpet to saturate the bottoms of the tufts and backing in an amount of from about 25 to 30% by weight of the carpet.

The carpet containing the frothed or cellular vinyl polymer composition is then passed through an oven at 270° to 350° F. to remove the water and to fuse or gel the vinyl polymer to form a cellular or frothed plasticized filled thermoplastic vinyl polymer composition layer on the back of the carpet. While the thermoplastic layer is still soft or hot, the carpet is compressed by passing through embossing or squeeze rolls to obtain a uniform thickness of from about 1/16" to 3/32". After cooling to ambient room temperature, the vinyl coated carpet is cut into square shapes or tiles of about 12"×12" or 18"×18". However, the tiles may be cut in other shapes.

The composition of the present invention can be applied to the back of any woven or nonwoven carpet (or rug) material to aid in securing the base yarns of the carpet such as Wilton, Axminster, knitted and other carpets, as well as to a secondary backing, it is particularly useful in the manufacture of piled or tufted carpet tiles. In piled or tufted carpets the fibers or yarn is needled or looped through the interstices or holes in a square woven or nonwoven primary cloth such as cotton, polypropylene, jute or other natural or synthetic fibrous material or mixture thereof. For a discussion of the manufacture of carpets and especially tufted carpets please see "Carpets And Other Textile Floor Coverings," Robinson, 2nd Ed., 1972, Textile Book Service, Division of Bonn Industries Inc., The Trinity Press, London. Please, also, see "Wellington Sears Handbook of Industrial Textiles," Kaswell, 1963, Wellington Sears Co., Inc., New York.

The yarns or tufts of the carpet can be natural or synthetic organic fibers or mixture thereof. Additionally, the yarns may vary from one type to another type. Examples of such yarns are those from silk, cotton, wool, hair, nylon, acrylics ("Acrilan"), polyester, polyvinyl chloride, vinyl chloride-vinyl acetate copolymers, polyurethanes, rayon, polyacrylonitriles, vinyl chloride or vinylidene chloride copolymerized with acrylonitrile, polyvinylidene chloride, polypropylene fibers and the like. Glass fibers may be blended or woven with the natural and/or synthetic organic fibers. These fibers or yarns can contain fire retardants, antistatic agents, bacteriostats, antidegradants, dyes, pigments, optical brighteners and so forth.

The following examples of backing compositions for making carpet tiles will serve to illustrate the present invention with more particularity to those skilled in the art. In the examples, the parts are parts by weight unless otherwise indicated. A minor or very small amount by weight of an aqueous alkali swellable polyacrylate thickener was added to each backing composition to give each composition an unfrothed Brookfield (RVF model) viscosity of from about 12,500 to 13,500 cps (#4 spindle at 20 rpm).

EXAMPLE 1

The following ingredients were mixed together to form an aqueous dispersion of latex and compounding ingredients suitable as a carpet backing to form carpet tiles:

| Ingredient | Parts By Weight | |
|---|---|---|
| | Dry | Wet |
| Latex (aqueous emulsion)[1] | 100.00 | 183.40 |

| Ingredient | Parts By Weight Dry | Wet |
|---|---|---|
| Non-silicone surface orienting type defoamer | .50 | .50 |
| N—octadecyl sulfosuccinamate (anionic surfactant) | 1.50 | 5.00 |
| Calcium carbonate | 300.00 | 300.00 |
| Inorganic pigment (color) | .35 | .35 |
| Froth aid[(2)] | 4.50 | 18.00 |
| Di-octyl phthalate aqueous emulsion (70% TSC) | 50.00 | 71.45 |

[(1)]Blend of three latices of:
(a) 37.5% by weight (dry) of a copolymer of about 89% by weight of vinyl chloride, 10% butyl acrylate and 1% acrylic acid, about 35% solids;
(b) 37.5% by weight (dry) of a copolymer of about 90% by weight of vinyl chloride and 10% ethyl acrylate and
(c) 25% by weight (dry) of an ethylene-vinyl chloride copolymer containing about 64% copolymerized vinyl chloride, about 33% solids.
[(2)]Composition comprising urea, sodium salt of condensed naphthalene sulfonic acid, mixture of $C_8$ to $C_{18}$ fatty alcohols, ammonium or sodium lauryl sulfate and water. See U.S. Pat. No. 4,172,067.

Application of froth on the back of a carpet was about 100 oz. per square yard. The froth on the carpet was then heated to remove water and gel the polymers. The carpet was passed through rollers while the polymers were hot to get the desired density, cooled and cut into carpet tiles.

EXAMPLE 2

This example is similar to Example 1, above. The following ingredients were mixed together to form a composition suitable for making carpet tiles:

| Ingredient | Parts By Weight Dry | Wet |
|---|---|---|
| Latex (copolymer of about 89% by weight of vinyl chloride, 10% butyl acrylate and 1% acrylic acid) | 100.00 | 183.40 |
| Non silicone surface orienting type defoamer | .50 | .50 |
| N—octadecyl sulfosuccinimate | 1.50 | 5.00 |
| Calcium carbonate | 300.00 | 300.00 |
| Inorganic pigment (color) | .35 | .35 |
| Froth aid[(2)] | 4.50 | 18.00 |
| Dioctyl phthalate aqueous emulsion (70% TSC) | 50.00 | 71.45 |

[(2)]Same as in Example 1.

The above composition was whipped with air to make a froth which was applied to the back of a carpet, heated to fuse and dry, crushed and used to make carpet floor tile.

EXAMPLE 3

This example is similar to Example 1, above. The following ingredients were mixed together to form a composition suitable for making carpet tiles:

| Ingredient | Parts By Weight Dry | Wet |
|---|---|---|
| Latex (copolymer of about 87% by weight of vinyl chloride, 10% butyl acrylate and 1% acrylic acid) | 50.00 | 91.60 |
| Latex (copolymer of about 36% by weight of ethylene and 64% of vinyl chloride) | 50.00 | 100.00 |
| Non silicone surface orienting type defoamer | .50 | .50 |
| N—octadecyl sulfosuccinamate | 1.50 | 5.00 |
| Calcium carbonate | 300.00 | 300.00 |
| Inorganic pigment (color) | .35 | .35 |
| Froth aid[(2)] | 4.50 | 18.00 |
| Dioctyl phthalate aqueous emulsion (70% TSC) | 50.00 | 71.45 |

[(2)]Same as Example 1.

The above composition was whipped with air in a frothing machine to make a froth which was applied to the back of a carpet, heated to fuse and dry the froth, crushed and used to make floor tiles.

I claim:
1. An aqueous composition comprising
   a. a latex of a vinyl polymer selected from the group consisting of polyvinyl chloride, polyvinylidene chloride, copolymers of vinyl chloride and vinylidene chloride and copolymers of at least 50% by weight of at least one monomer selected from the group consisting of vinyl chloride and vinylidene chloride and the balance essentially at least one copolymerizable ethylenically unsaturated monomer, other than said vinyl chloride or vinylidene chloride, having from 2 to 14 carbon atoms and mixtures of said polymers,
   b. an aqueous emulsified compatible plasticizer for said vinyl polymer in an amount (dry) sufficient to plasticize said vinyl polymer to achieve flexibility on fusing,
   c. from about 100 to 500 parts by weight of finely divided inorganic filler per 100 parts by weight (dry) of said vinyl polymer and
   d. a frothing agent in an amount by weight (dry) sufficient to froth said composition.
2. An aqueous composition according to claim 1 where said plasticizer is used in an amount of from about 15 to 75, preferably from about 40 to 60, parts by weight total (dry) per 100 parts by weight (dry) of said vinyl polymer and where said filler is used in amount of from about 200 to 400 parts by weight per 100 parts by weight (dry) of said vinyl polymer.
3. An aqueous composition according to claim 1 where said filler is calcium carbonate.
4. An aqueous composition according to claim 3 where said latex is a blend of
   a vinyl chloride-butyl acrylate-acrylic acid copolymer latex,
   a vinyl chloride-ethyl acrylate copolymer latex and an ethylene-vinyl chloride copolymer latex.
5. An aqueous composition according to claim 3 where said latex is a vinyl chloride-butyl acrylate-acrylic acid copolymer latex.
6. An aqueous composition according to claim 3 where said latex is a blend of
   a vinyl chloride-butyl acrylate-acrylic acid copolymer latex and
   an ethylene-vinyl chloride copolymer latex.

* * * * *